Aug. 28, 1928.
T. J. BARNES
1,682,468
PULVERIZER DISK CONSTRUCTION
Original Filed Nov. 5, 1925
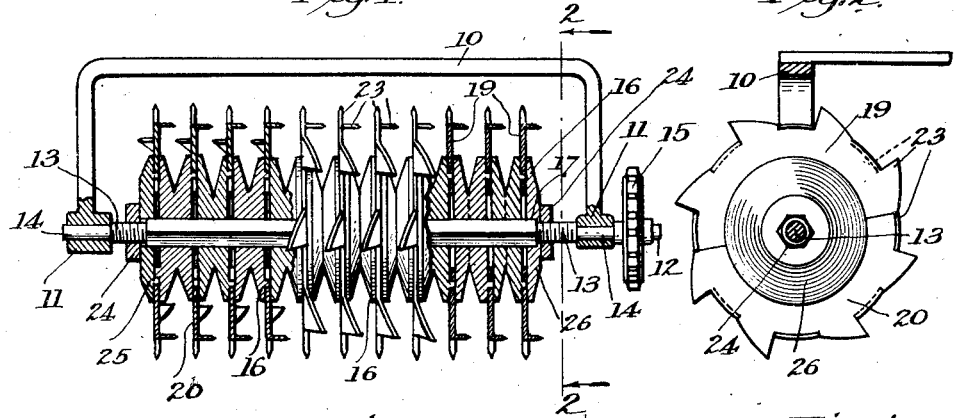
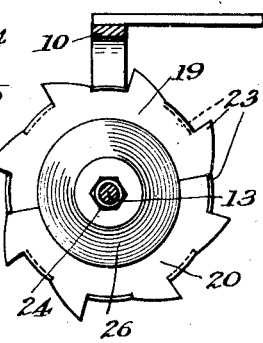
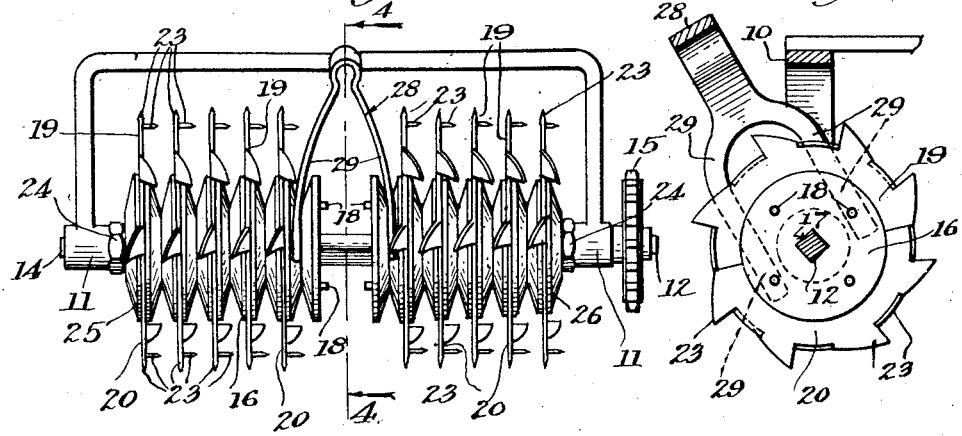
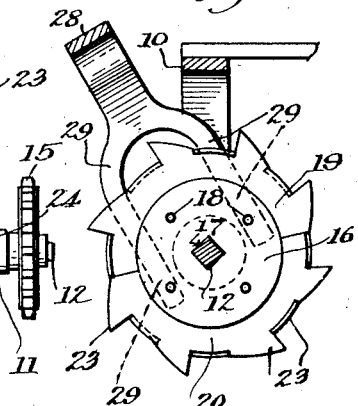
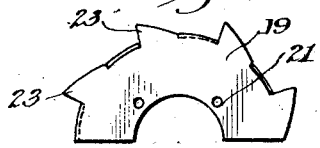
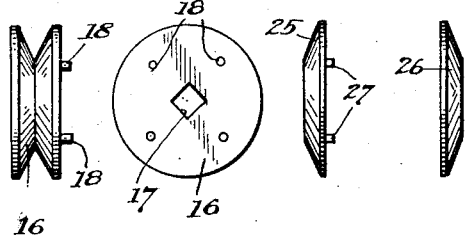
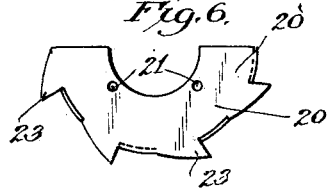
Inventor:
Thomas J. Barnes.
by Hazard and Miller
Attorneys Patented Aug. 28, 1928.

1,682,468

UNITED STATES PATENT OFFICE.

THOMAS J. BARNES, OF AZUSA, CALIFORNIA.

PULVERIZER-DISK CONSTRUCTION.

Application filed November 5, 1925, Serial No. 66,996. Renewed June 27, 1928.

This invention relates to improvements in disks for agricultural implements and particularly for pulverizers. The improved disk construction is primarily designed to be used in conjunction with the pulverizer disclosed in my co-pending application Serial No. 7,317 filed February 6, 1925, and may be considered as an improvement upon the disk construction disclosed in that application.

An object of this invention is to provide an improved disk construction wherein a plurality of disks are mounted in parallel relation about a shaft and which are so constructed that anyone of the disks can be easily and quickly removed in case it becomes damaged and requires replacement without removing all of the other disks upon the shaft.

Another object of this invention is to provide an improved disk for agricultural implements which is toothed in an improved manner which makes it specially useful in pulverizing the soil.

With the foregoing and other objects in view which will be made manifest in the following detailed description and specifically pointed out in the appended claims, reference is had to the accompanying drawings for an illustrative embodiment of the invention, wherein:

Figure 1 is a view in elevation, parts being broken away and shown in vertical section, illustrating the complete assembly of the improved disk construction.

Fig. 2 is a vertical section taken substantially on the line 2—2 of Fig. 1,

Fig. 3 is a view similar to Fig. 1, illustrating the manner in which one of the disks may be removed without requiring the removal of all of the other disks upon the shaft, Fig. 4 is a vertical section taken on the line 4—4 of Fig. 3, Figs. 5 and 6 are views in side elevation of two segments which cooperate to form one of the improved disks, Fig. 7 is a side elevation of one of the spacing members, Fig. 8 is an end elevation of the spacing member shown in Fig. 7, Fig. 9 is a side elevation of one of the end spacing or clamping members, and Fig. 10 is a side elevation of the other end member.

Referring to the accompanying drawings wherein similar reference characters designate similar parts throughout, a part of the agricultural implement or pulverizer is illustrated as consisting of a yoke 10 providing bearings 11 for a shaft 12. The shaft 12 is squared for the major portion of its length and adjacent its ends it is threaded, as indicated at 13. At the ends of the shafts there are reduced portions 14 which fit within the bearings 11. In embodying the invention in conjunction with the pulverizer disclosed in my co-pending application, the shaft 12 is forcibly or mechanically rotated, and consequently the shaft 12 is shown as provided with a gear 15 by which it may be turned. On the squared portion of the shaft there are a plurality of spacing or clamping members 16 which are in the form of relatively thick disks and which have annular grooves formed upon them. These spacing members have squared holes 17 formed through them so that they may be placed upon the squared portion of the shaft 12 and held against rotation thereon, although they are capable of sliding axially upon the shaft. The spacing members 16 are arranged in pairs or two parts and the confronting faces of each pair are substantially flat. On one flat side of one part of each pair of the spacing members 16 there are formed projecting lugs or pins 18.

Between the spacing members 16 the disks of the improved construction are arranged. Each of the disks consists of two segments 19 and 20 which are semi-circular in form and each of the segments has apertures 21 formed therein for the reception of the lugs or pins 18. Upon the edges of the segments there are formed teeth 23, and as clearly illustrated upon the drawings alternate teeth are bent laterally out of the planes of the bodies of the segments and upon opposite sides. The intermediate teeth are allowed to remain in the same plane as the body of the disk. It will be readily understood that when the segments 19 and 20 of the disks are positioned between the spacing members 16, the lugs 18 extend through the apertures 21, thus preventing withdrawal of the segments from between the spacing members. The spacing members are maintained in clamping relation upon the segments by means of jam nuts 24, which are threaded onto the threaded portion 13 of the shaft 12. In this manner it will be readily appreciated that the lugs 18 extending into the apertures 21 not only prevent the radial movement of the segments 19 and 20 from the shaft 12, but also prevent any rotational movement of the segments 19 and 20 between the spacing members, thus rigidly holding the segments with respect to the shaft. The end spacing members, indicated at 25 and 26, are engaged by the jam nuts 24.

In case one of the disks should become damaged so that it is desired to repair it or replaced it, it is not necessary in the improved construction to remove all of the disks upon the shaft. In order to remove one of the disks, it is merely necessary to back off or loosen one of the jam nuts 24, allowing the spacing members to separate. If the jam nuts 24 are merely loosened, thus loosening all of the disks segments and spacing members, the various disks segments are apt to drop out from between the spacing members. Consequently, I provide a U-shaped spring member 28 which has the ends of its arms bifurcated, providing yokes 29. Before the jam nuts 24 are backed off, the arms of the U-shaped member 28 are pressed toward each other and the yokes 29 are caused to slide into the grooves upon the spacing members 16 on opposite sides of that disk which is to be removed. The jam nuts 24 can then be loosened, and the resiliency of the U-shaped member 28 will cause the spacing member 16 and the disk segments to slide on the shaft and keep in engagement with the jam nuts, at the same time separating the two spacing members 16 on the opposite sides of the disk which is to be removed, as shown in Fig. 3. In such position the two disk segments can be readily withdrawn and new disk-segments can be substituted and the jam nuts 24 tightened up. In this manner it will be appreciated that it is not necessary to remove all of the disks upon the shaft in order to replace or repair one of them.

It will be understood that various changes in the detail of construction may be made without departing from the spirit or scope of the invention as defined by the appended claims.

I claim:

1. A pulverizer disk construction having a squared shaft between its end portions and screw threaded just outside of the square portion, a plurality of diabolo-shaped spacing members having squared central openings fitting upon the square portion of the shaft, the confronting faces of each spacing member being substantially flat, there being projecting pins upon the flat face of one part of each spacing member, disks constructed of sheet metal in segments fitting between the flat faces of the spacing members and having perforations therethrough to receive the pins, and jamb nuts upon the screw threaded portions of the shaft.

2. A pulverizer disk construction having a squared shaft between its end portions and screw threaded outside of the squared portion, pairs of diabolo-shaped spacing members having squared central openings fitting upon the squared portion of the shaft, the confronting faces of each pair of diabolo shaped members being substantially flat, there being projecting pins upon the flat face of one part of each member, disks constructed of sheet metal and formed in segments fitting between the flat faces of the spacing members and having perforations to receive the pins, a pair of conical end members having flat faces, one of which has projections thereon to fit in the perforations of one of said sheet metal disks, and jamb nuts on the screw threaded portions of the shaft against the last mentioned conical spacing members.

In testimony whereof I have signed my name to this specification.

THOMAS J. BARNES.